(12) United States Patent
Cooley et al.

(10) Patent No.: US 10,301,207 B2
(45) Date of Patent: May 28, 2019

(54) NON-SCALING WET AIR OXIDATION PROCESS

(71) Applicant: Siemens Energy, Inc., Orlando, FL (US)

(72) Inventors: Curtis D. Cooley, Wausau, WI (US); Simon Larson, Wausau, WI (US); Chad L. Felch, Kronenwetter, WI (US)

(73) Assignee: SIEMENS ENERGY, INC., Orlando, FL (US)

( * ) Notice: Subject to any disclaimer, the term of this patent is extended or adjusted under 35 U.S.C. 154(b) by 0 days.

(21) Appl. No.: 16/127,402

(22) Filed: Sep. 11, 2018

(65) Prior Publication Data

US 2019/0002322 A1 Jan. 3, 2019

Related U.S. Application Data

(62) Division of application No. 15/504,571, filed as application No. PCT/US2015/046058 on Aug. 20, 2015, now Pat. No. 10,099,953.

(60) Provisional application No. 62/039,596, filed on Aug. 20, 2014.

(51) Int. Cl.
*B01J 20/34* (2006.01)
*C02F 11/08* (2006.01)
*C02F 1/28* (2006.01)
*C02F 101/30* (2006.01)

(52) U.S. Cl.
CPC .......... *C02F 11/08* (2013.01); *B01J 20/3416* (2013.01); *B01J 20/3483* (2013.01); *C02F 1/283* (2013.01); *C02F 2101/30* (2013.01); *C02F 2209/02* (2013.01); *C02F 2303/16* (2013.01); *C02F 2303/22* (2013.01)

(58) Field of Classification Search
CPC .... B01J 20/34; B01J 20/3416; B01J 20/3483; C02F 11/08; C02F 1/283
USPC ......................................................... 502/51
See application file for complete search history.

(56) References Cited

U.S. PATENT DOCUMENTS

| | | |
|---|---|---|
| 5,183,577 A | 2/1993 | Lehmann |
| 6,121,179 A | 9/2000 | McBrayer, Jr. et al. |

*Primary Examiner* — Edward M Johnson

(57) ABSTRACT

There is provided a system and a method for regenerating a material that reduce the incidence of scaling due to scale forming contaminants. The method may include reducing a temperature of a treated material exiting a wet air oxidation unit in a scale reducing heat exchanger prior to delivery of the treated material to a second heat exchanger which heats a source waste material comprising a scale forming contaminant therein with heat from the first treated material to form a heated waste material comprising the scale forming contaminant.

8 Claims, 5 Drawing Sheets

NON-SCALING WET AIR OXIDATION PROCESS

CROSS-REFERENCE TO RELATED APPLICATIONS

This application is a divisional application of U.S. patent application Ser. No. 15/504,571, filed Aug. 20, 2015, which claimed the benefit of the Aug. 20, 2014 filing date of U.S. Provisional Application No. 62/039,596. The contents of each application is hereby incorporated by reference herein.

FIELD

The present disclosure relates generally to treatment systems, and more particularly to systems and processes for reducing scaling due to scale forming contaminants in a wet air oxidation (WAO) system.

BACKGROUND

Wet air oxidation (WAO) is a well-known technology for treating process streams, and is widely used, for example, to destroy pollutants in wastewater. The process involves aqueous phase oxidation of undesirable constituents by an oxidizing agent, generally molecular oxygen from an oxygen-containing gas, at elevated temperatures and pressures. In addition, the process can convert organic contaminants to carbon dioxide, water, and biodegradable short chain organic acids, such as acetic acid. Inorganic constituents including sulfides, mercaptides, and cyanides can also be oxidized. WAO may be used in a wide variety of applications to treat process streams for subsequent discharge, in-process recycle, or as a pretreatment step to supply a conventional biological treatment plant for polishing.

Systems employing activated carbon, such as powdered activated carbon treatment (PACT) and granular activated carbon (GAC) systems, utilize different activated carbons to remove contaminants from various fluid streams. At some point, the ability of the activated carbon to remove further contaminants decreases. Wet air regeneration (WAR) systems, a type of a WAO system, have thus been employed which utilize high temperature and pressure conditions to regenerate spent carbon from such activated carbon systems while simultaneously oxidizing the biological solids accompanying the spent carbon. In a number of known systems, the oxidation reactions occur at temperatures of 150° C. to 320° C. (275° F. to 608° F.) and at pressures from 10 to 220 Bar (150 to 3200 psi).

One common problem in known WAO systems is the build up of solids within components, such as fluid pathways, heat exchangers, and the like of the system. This "build up" is referred to as scaling. One such scale forming contaminant is calcium sulfate. To prevent the build up of calcium sulfate or like materials in the components of a WAO system, the scale forming contaminant must be periodically removed from the system. A number of techniques have been developed for removing scale forming contaminants to prevent disruption or loss of efficiency of the WAO system. These known solutions, however, have notable deficiencies. For example, one proposed solution utilizes a hot nitric acid wash through the relevant components. This process, however, is time consuming and can be dangerous as operators are required to handle concentrated and/or hot nitric acid. The acid wash process also requires a WAO system to be shut down, which typically results in a larger system being installed to account for the associated system downtime.

Further, WAO systems are currently built with "tube and shell" heat exchangers to accommodate material heading to the reactor of the WAO system, as well as material from the reactor. Such heat exchangers allow the effluent from the WAO system, which is generally very hot, to provide heat to the material to be input into the WAO system. In such a case, when a scale forming contaminant, such as calcium sulfate, is present in the material to be input to the WAO system, the calcium sulfate may collect in undesired locations, such as on the tube side of the heat exchanger portion due to the inverse solubility of calcium sulfate. This scaling problem is very serious and may, in fact, lead to complete system shutdown.

BRIEF DESCRIPTION OF THE DRAWINGS

The invention is explained in the following description in view of the drawings that show.

DETAILED DESCRIPTION

Figure 1:
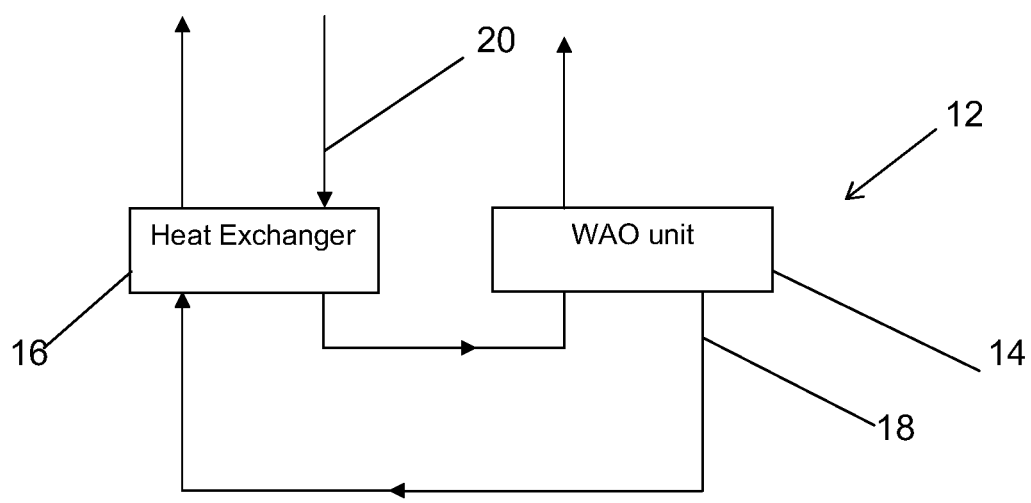
FIG. 1 is a schematic of a known wet air oxidation (WAO) system.

The present inventors have developed systems and processes that substantially prevent scaling, particularly in the treatment of a waste material in a wet air oxidation (WAO) system. In an aspect, the systems and processes described herein reduce the problem of scaling by first reducing a temperature of a treated material exiting a reactor (WAO unit) of the WAO system via a first heat exchanger prior to delivery of the treated material to a second heat exchanger, which heats waste material to be input to the WAO unit via heat from the treated material. The waste material is one which includes an amount of a scale forming contaminant therein. By first reducing a temperature of the treated material before contacting the treated material with the material to be input to the WAO unit, the likelihood of undesired scaling may be substantially reduced. This is particularly due to the fact that the scale forming contaminant may be increasingly insoluble in a medium as the temperature of the scale forming contaminant and the medium increase. Thus, by carefully controlling the temperature within the WAO system to ensure the scale forming contaminant remains in solution as the materials travel to the reactor of the WAO system, aspects of the present invention may substantially eliminate or reduce scaling problems.

As used herein, the term "about" refers to a value which may be ±5% of the stated value.

Now referring to the figures, for purposes of explanation, there is shown a known WAO system 12 for regenerating a waste material, such as a spent carbon material, as is known in the art. The WAO system 12 may include a reactor (e.g., a WAO unit 14) and a heat exchanger 16 for heating the material to be introduced into the WAO unit 14. In operation, a treated material 18 exits the WAO unit 14 and is delivered to the heat exchanger 16, e.g., a shell and tube heat exchanger, where heat from the treated material 18 may be utilized to heat incoming waste material 20 on its way to the WAO unit 14.

In many cases, the waste material 20 delivered to the WAO unit 14 also includes a component that causes scaling (hereinafter scale forming contaminant). Due to the high temperatures of the wet air oxidation process in the WAO unit 14, the treated material 18 exiting from the WAO unit 14 is typically very hot due to the high temperatures of the WAO process, e.g., from 150° C. to 320° C. The present inventors have recognized that the waste material 20 in known systems is typically heated to a temperature which causes scale forming contaminants therein (when present) to come out of solution, thereby resulting in significant undesired scaling of components in the WAO system 12, such as valves, flow paths, and the heat exchanger 16, for example. This is due to the fact that scale forming contaminant may be one with an inverse solubility—meaning one whose solubility in a medium actually decreases as a temperature of the medium increases at a given concentration of the contaminant. As mentioned previously, scaling is a serious issue and can even result in complete shutdown of the associated system.

Figure 2:
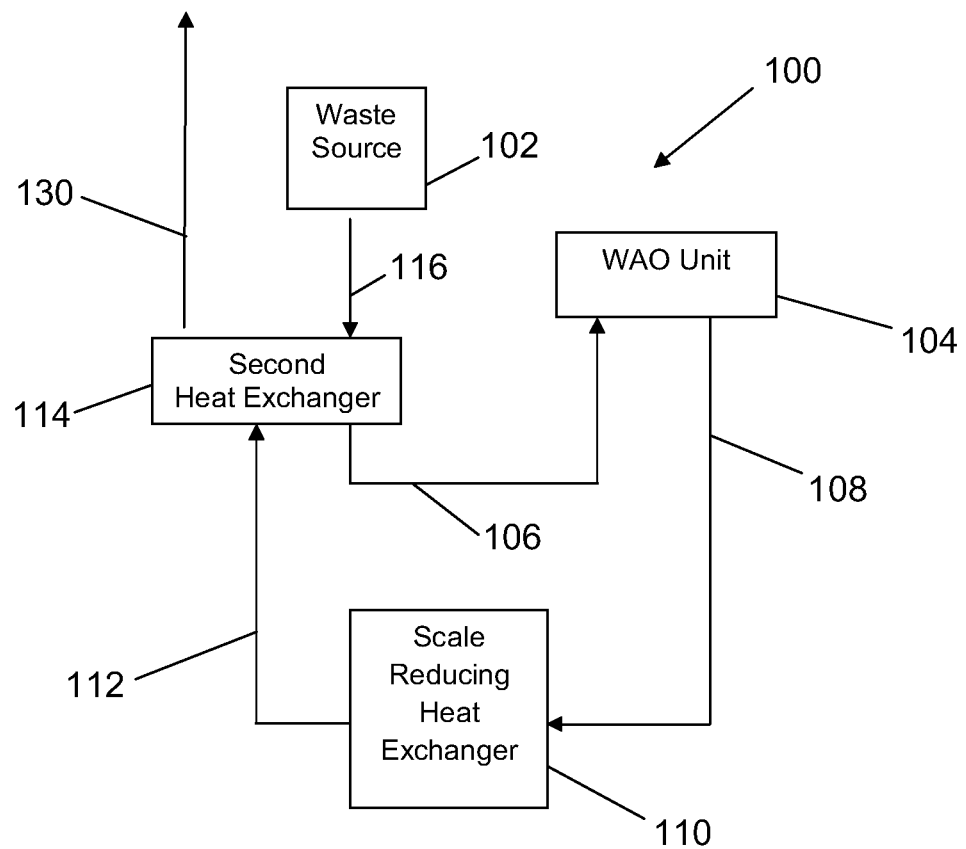
FIG. 2 is a schematic of a system for reducing scaling in accordance with an aspect of the present invention.

The present inventors have thus developed systems and processes which resolve the above issues by reducing the likelihood of undesired scaling in a wet air oxidation system. Referring now to FIG. 2, there is shown a wet air oxidation (WAO) system 100 and a source of waste material (waste source) 102 in fluid communication with the WAO system 100. The WAO system 100 comprises at least one or more dedicated reactor vessels (WAO unit 104), heat exchangers 110, 114 (discussed below), and necessary or desired components to deliver and receive materials in their desired locations. The WAO unit 104 is arranged for receiving a heated waste material 106 comprising at least a scale-forming contaminant therein. Within the WAO unit 104, the heated waste material 106 is regenerated and a resulting first treated material 108 may exit the WAO unit 104. A scale reducing heat exchanger 110 is provided in fluid communication with the WAO unit 104 and receives the first treated material 108 from the WAR unit 104. The scale reducing heat exchanger 110 discharges a second treated material 112 having a reduced temperature relative to the first treated material 108.

In addition, a second heat exchanger 114 is provided in fluid communication with the scale reducing heat exchanger 110 to receive the second treated material 112 having the reduced temperature. At the same time, the second heat exchanger 110 may be further arranged to receive a source waste material 116 from a suitable source (e.g., the waste source 102) that generates or otherwise provides the source waste material 116. From the second heat exchanger 114, the heated waste material 106 exits the second heat exchanger 114 and travels to the WAO unit 104 for oxidation and/or regeneration of the material therein. The reduced temperature of the second treated material 112 relative to the first treated material 108 provided by the scale reducing heat exchanger 110 may be effective to reduce a degree of undesired scaling in the WAO system 100, including within the second heat exchanger 114, valves, flow paths, and any other components in fluid communication with the WAO unit 104.

Accordingly, aspects of the present invention may significantly reduce the incidence of undesired scaling due to scale forming contaminants via improved temperature control of the materials in the system 100. Since the scale forming contaminants are ones in which increased temperatures result in decreased solubility thereof, maintaining the temperatures of the materials in the system 100 below predetermined temperature(s) which increase insolubility of the scale forming contaminants may significantly reduce undesired scaling in the system 100.

The waste source 102 may comprise any suitable system or apparatus which generates a source waste material 116 comprising at least one scale forming contaminant therein. By way of example, the scale-forming contaminant may comprise a member selected from the group consisting of aluminum, calcium, carbonate, iron, magnesium, phosphorus, sulfate, and combinations thereof. In a particular embodiment, the scale forming contaminant may be in the form of calcium sulfate. In any case, due to the presence of the scale forming contaminant, the source waste material 116 may be one that may potentially cause scaling of within the second heat exchanger 114, valves, flow paths, and any other components in fluid communication with the WAO unit if the temperature of the source waste material 116 is not properly controlled as it travels to the WAO unit 104.

In an embodiment, the waste source 102 may comprise a system configured to treat a fluid with a carbon material to remove target components therefrom and generate a "spent carbon" material. Thus, in an embodiment, the source waste material 116 may comprises a spent carbon material. By "spent," it is meant that an ability of the carbon material to remove further target components in a fluid has at least decreased. In addition to the spent carbon, the source waste material 116 comprises an amount of at least one scale forming contaminant therein.

In a particular embodiment, the waste source 102 may comprise a powdered activated carbon treatment (PACT) system as is known in the art comprising an effective amount of powdered activated carbon material for capturing at least a portion of organic contaminants in a fluid introduced to the PACT system. Alternatively, the waste source 102 may further or instead comprise a granular activated carbon (GAC) treatment system. Granular activated carbon typically has a larger particle size and surface area than powdered activated carbon. In certain embodiments, microorganisms may be added to the associated system to help break down the organic compounds adsorbed or otherwise loaded on the activated carbon. Thus, in certain embodiments, the source waste material 116 may also include biological material, as well as byproducts of the breakdown reactions. Exemplary activated carbon systems are described in U.S. Pat. No. 9,090,487 and US Published Patent Application No. 2014/0061134, the entirety of each of which is incorporated by reference herein.

When an activated carbon system is employed, the fluid to be treated thereby may comprise any organic compound-containing stream, such as a wastewater stream from a refinery process. Exemplary materials in the stream to be removed by the waste source 102 may include pesticides herbicides, phenols, phthalates, and hydrocarbons, e.g., aromatic hydrocarbons, aliphatic hydrocarbons and the like.

At some point after operation of the waste source 102 to remove components from a fluid using activated carbon, the ability of the carbon material to remove further target components may diminish or become exhausted ("spent" in either case). In this case, an amount of the source waste material 116, which may comprise spent carbon material, biological material (when present), scale forming contaminants, and any other components, may be delivered from the waste source 102 to the second heat exchanger 114, and then on to the WAO unit 104. When the source waste material 116 comprises at least spent carbon and biological material, and the spent carbon is regenerated and the biological material is oxidized in the WAO unit 104, the process may be referred to as wet air regeneration (WAR). Thus, in an embodiment, a WAR process is performed in the WAO unit 104.

In an embodiment, the source waste material 116 may be in the form of a slurry or sludge having a water content ranging from about 90% to about 97% (solids content of about 3-10%). In certain embodiments, the source material may be conditioned in a gravity thickener (e.g., a sedimentation tank) to provide the source waste material 116 in the form of a thickened sludge material.

As mentioned, the WAO system 100 may comprise one or more dedicated reactor vessels (e.g., WAO unit 104) in which oxidation and/or regeneration of the heated waste material 106 may take place. In an embodiment, the incoming heated waste material 106 may be mixed with a pressurized oxygen-containing gas, which may be supplied by a compressor, prior to flow through the second heat exchanger 114. Within the WAO unit 104, the material therein is heated for a suitable time and under suitable conditions effective to oxidize undesired components in the material and produce a treated material 108, such as a regenerated carbon product. In an embodiment, the WAO process is carried out at a temperature of 150° C. to 320° C. (275° F. to 608° F.) at a pressure of 10 to 220 bar (150 to 3200 psi). Upon completion of the WAO process, the first treated material 108 may then exit the WAR unit 104.

From the WAR unit 104, the still hot first treated material 108 may be utilized to warm the source waste material 116 to be fed to the WAO unit 104 for regeneration. In an embodiment, the first treated material 108 may comprise a regenerated material, such as a regenerated carbon material, as well as an oxygen depleted gas mixture, which typically includes the removed contaminants. In this instance, the regenerated material and the oxygen depleted gas mixture may be fed collectively or separately through the scale reducing heat exchanger 110 and then to the second heat exchanger 114 to heat the source waste material 116.

To reiterate, if treated material directly exiting the WAO unit 104 were to heat the waste material to be fed into the WAO unit 104, the heat from the treated material would likely result in precipitation of the scale forming contaminants, thereby resulting in significant undesired scaling within components of the system, including the heat exchanger(s), flow paths (piping, tubing, etc.), valves, and the like. For at least this reason, referring again to FIG. 2, the first treated material 108 may instead be fed to the scale reducing heat exchanger 110 to reduce the temperature of the treated material 108 prior to the use of the treated material 108 to warm the source waste material 116 to be fed to the WAO unit 104 for oxidation and/or regeneration thereof.

In accordance with one aspect, the scale reducing heat exchanger 110 may be configured to reduce a temperature of the first treated material 108 to one which at least reduces a likelihood of scaling upon heat transfer between the first treated material 108 and the source waste material 116 (which comprises the scale forming contaminant) in the second heat exchanger 114. It is contemplated that the reduced likelihood of scaling may take place at any location between the scale reducing heat exchanger 110 and the internal cavity of the WAO unit 104 where oxidation and/or regeneration takes place. Once the heated waste material 106 is within the WAO unit 104, scaling is not of concern.

In an embodiment, the scale reducing heat exchanger 110 may be effective to reduce a temperature of the first regenerated carbon material 108 to a temperature that is less than a solubility temperature limit of a scale forming contaminant in the source waste material 116 at a given concentration of the scale forming contaminant. The solubility temperature limit may be considered to be a temperature at a particular concentration of the scale forming contaminant over which any increase in temperature will cause the scale forming contaminant to increasingly fall out of solution and plate (deposit) on a surface, such as a heat exchanging surface. As such, increasing the temperature of the medium over the solubility temperature limit may significantly increase the amount of scale produced by that contaminant in the second heat exchanger 114. However, below that solubility temperature limit, it is appreciated that little or no scale may be formed.

By way of example only, the scale forming contaminant may comprise calcium sulfate. Calcium sulfate has a solubility of about 100 mg/L at 130° C. Accordingly, at temperatures greater than 130° C., the solubility of calcium sulfate may decrease in the medium in which it is solubilized. Thus, by way of example only, if the scale reducing heat exchanger 110 limits the temperature of the second heat exchanger 114 to a temperature of 130° C. or less, the likelihood of undesired scaling within the second heat exchanger 114 and components downstream thereof may be substantially reduced or eliminated. In this way, the scale reducing heat exchanger 110 may substantially reduce or prevent the occurrence of undesired scaling in the system 100.

The degree of temperature reduction between the first treated material 108 and the second treated material 112 is without limitation. As such, the scale reducing heat exchanger 110 may be any suitable heat exchanger effective to achieve the desired temperature reduction. In addition, it would be appreciated by the skilled artisan that the selection of a heat exchanger and any parameters (e.g., residence time, flow rates, volumes, pressures, etc.) may be modified as necessary to bring about the desired degree of temperature reduction.

Figure 3:
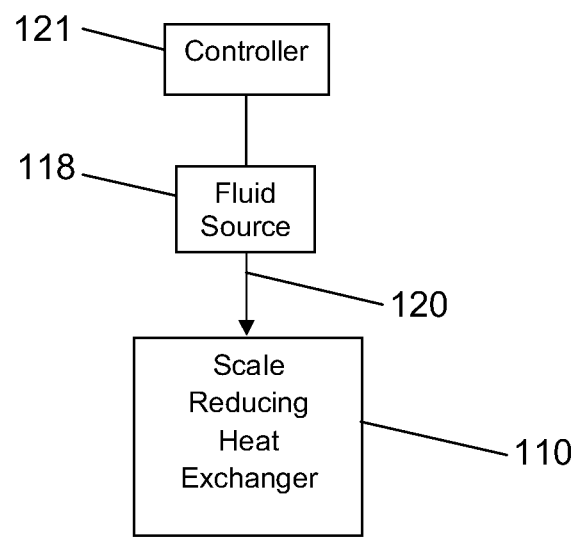
FIG. 3 shows a fluid source configured to moderate temperature in the scale reducing heat exchanger in accordance with another aspect of the present invention.

In certain embodiments, a cooling fluid, such as water, may be flowed through the heat exchanger to bring about the desired temperature reduction. Referring to FIG. 3, there is shown a fluid source 118 in fluid communication with the scale reducing heat exchanger 110 to deliver an amount of a fluid 120 to the scale reducing heat exchanger 110 effective to control an extent of temperature reduction for the first treated material 108. In an embodiment, the system 100 may further include a fluid flow controller 121 in communication with the fluid source 118 effective to regulate the amount of the fluid 120 fed to the scale reducing heat exchanger 110. In the embodiments illustrated, a single input, output, and scale reducing heat exchanger 110 are shown. However, it is understood also that the present invention is not so limited and that a greater number of these components (and/or any other components in the system 100 or described herein) may also be provided.

Referring again to FIG. 2, the second treated material 112 may exit the scale reducing heat exchanger 110 and may be fed to the second heat exchanger 114. At the same time, the source waste material 116 may be fed to the second heat exchanger 114 to be warmed by the second treated material 112 in the second heat exchanger 114. In an embodiment, the second tube exchanger 114 may comprise a shell and tube heat exchanger as is known in the art and readily commercially available. A shell and tube heat exchanger readily allows the cold source waste material 116 to be heated in the tubes of the second heat exchanger 114, for example, while the shells of the second heat exchanger 114 allow the second treated material 112 to be cooled as it heats the source spent carbon material 116.

From an outlet of the second heat exchanger 114, a resulting heated waste material 106 (comprising at least one scale forming contaminant) may be fed to an inlet of the WAO unit 104 for oxidation of the heated waste material 106. In addition, after travel through the second heat exchanger 114, a resulting third treated material 130, which has been further cooled by the second heat exchanger 114, may be fed to storage, or directly used in further processing and treatment. When the treated material comprises regenerated carbon, it is appreciated that the regenerated carbon may be directly returned to the PACT system for carbon reuse.

In certain embodiments, it may be desirable to heat the source waste material 116 to as high of a temperature as is possible without causing scaling in the system 100. In addition, it may be appreciated by the skilled artisan that the temperature to which the heated waste material 106 is raised may be dependent on the collective concentration of scale forming contaminants in the system 100. Without limitation, in an embodiment, the heated spent material 106 may have a temperature of 100° C. to about 185° C. to substantially reduce or eliminate the likelihood of scaling due to scale forming contaminants, e.g., calcium sulfate, in the travel of waste material to the WAO unit 104.

Figure 4:
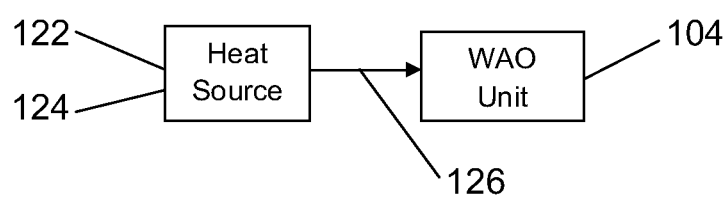
FIG. 4 shows an auxiliary heat source configured to provide heat to a WAO unit in accordance with an aspect of the present invention.

In addition, in certain embodiments, since the heated waste material 106 may not be as hot as in prior art materials entering the WAO unit 104, the WAO unit 104 may further comprise one or more additional heat sources to introduce added heat to the WAO unit 104 to carry out the oxidation process. In an embodiment, as shown in FIG. 4, the heat source 122 may comprise a steam source 124 which provides steam 126 at a predetermined pressure to the WAO unit 104 for an auxiliary source of heat.

Figure 5:
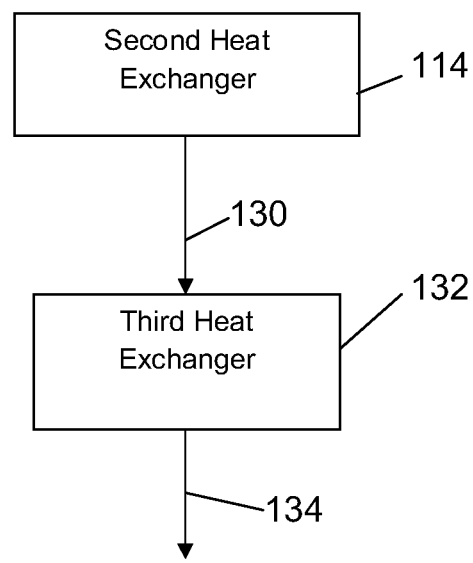
FIG. 5 shows a third heat exchanger in fluid communication with the second heat exchanger in accordance with an aspect of the present invention.

In accordance with another aspect of the present invention, as shown in FIG. 5, at least a portion of the third treated material 130 may be fed from the second heat exchanger 114 to a third heat exchanger 132 for further cooling of the third treated material 130. From the third heat exchanger 132, a fourth treated material 134 may exit the third heat exchanger 132 and be fed downstream for further processing, or delivered to a suitable location and vessel for storage, transport, or the like.

In accordance with another aspect, there is provided a process which may reduce scaling in a system 100 for treating a material using wet air oxidation. The process may comprise reducing a temperature of a first treated material 108 fed from a wet air oxidation unit 104 via a first heat exchanger (e.g., scale reducing heat exchanger 110) prior to delivery of the treated material 108 to a second heat exchanger 114, which heats a source waste material 116 comprising at least one scale forming contaminant therein with heat from the first treated material 108 to form a heated waste material 106. The reduction in temperature of the first treated material 108, for example, may be effective to decrease a likelihood of undesired scaling in the system 100 (e.g., scaling in the second heat exchanger 114 and flow paths leading to the WAO unit 104) as waste material is fed to the WAO unit 104.

In accordance with another aspect, there is provided a regeneration process which may reduce scaling in a system (e.g., system 100). In this embodiment, the wet air oxidation system 100 and unit 104 may comprise a wet air regeneration system and unit, respectively, for the regeneration of a spent carbon material. In this embodiment, the process may include: (a) reducing a temperature of a first treated material 108, such as a regenerated carbon material and/or an oxygen depleted gas mixture, discharged from a wet air regeneration unit 104 in a first heat exchanger (e.g., scale reducing heat exchanger 110); (b) delivering the first treated material 108 from the first heat exchanger (e.g., scale reducing heat exchanger 110) to a second heat exchanger 114. The second heat exchanger 114 heats a source waste material 116 (such as a material comprising spent carbon and a scale forming contaminant) with heat from the first treated material 108 to generate a heated waste material 106. The process further includes: (c) delivering the heated waste material 106 to the wet air regeneration unit 104 for regeneration of the heated waste material 106. The reducing a temperature of the first treated material 108 may be effective to reduce a degree of undesired scaling in the associated system as the waste material is fed to the wet air regeneration unit 104.

In the embodiments described herein, it is appreciated that one or more inlets, pathways, outlets, pumps, valves, coolers, energy sources, flow sensors, or controllers (comprising a microprocessor and a memory), or the like may be included in any of the systems described herein for facilitating the introduction, introduction, output, timing, volume, selection, and direction of flows of any of the components (e.g., regenerated carbon, spent carbon, steam, cooling fluids, therein) therein. A further exemplary WAO system and components thereof are set forth in U.S. Pat. No. 8,501,011, which is incorporated by reference herein.

The function and advantages of these and other embodiments of the present invention will be more fully understood from the following examples. These examples are intended to be illustrative in nature and are not considered to be limiting the scope of the invention.

EXAMPLE

Spent carbon was processed in a system which contained calcium as the known scale-forming contaminant. The liquid flow rate was approximately 20 m$^3$/h and the air flow rate was approximately 1100 kg/h with the WAR reactor operating at approximately 245° C. The general flow path was as follows: A high pressure pump pressurized a liquid slurry containing spent carbon and a high pressure air compressor injected atmospheric air into a common mix point. This mixture entered a tube side of a cold heat exchanger. The heat exchanger was a tube and shell type which operated countercurrently. Two heat exchanger bundles were provided connected in series, meaning the tube exit from the colder heat exchanger fed the tube inlet of the hotter heat exchanger. Furthermore, the shell outlet of the hotter heat exchanger fed the shell inlet of the colder heat exchanger.

From the tube outlet of the hotter heat exchanger, ancillary energy was added by a steam condensing tube and shell heat exchanger. The process mixture was contained in the tubes and made multiple passes within a single shell supplied with steam. The steam condenses on the tubes providing energy when required start-up or when the prior heat exchanger begins to foul with scale. The mixture exiting the steam heat exchanger was directed to the reactor where an exothermic reaction occurs, generating heat. The regenerated mixture exits the reactor and fed the shell side of the hotter heat exchanger. The hot mixture was cooled by the incoming feed. After the mixture exited the shell side of the colder heat exchanger, the mixture was depressurized. The mixture was separated into a vapor/gas and liquid/solids streams and discharged to the appropriate locations.

Figure 6:
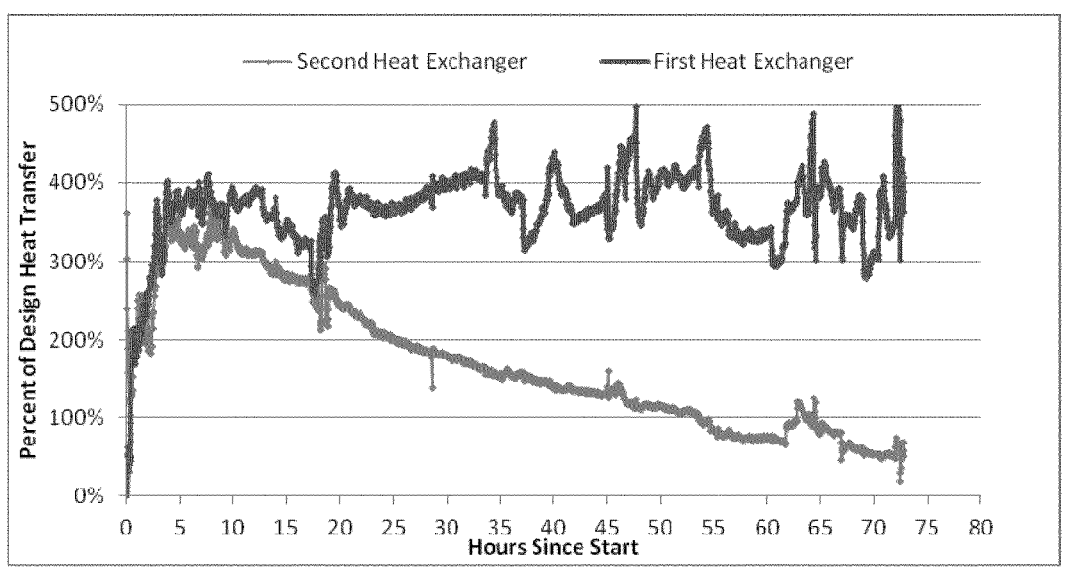
FIG. 6 is a graph showing the effects of scaling on two different heat exchangers in accordance with an aspect of the present invention.

Referring to FIG. 6, there is shown the effects of scaling on the two heat exchangers operating at two different temperatures. Experimental results showed a decrease in heat exchanger performance over time of the hotter heat exchanger. In this example, the first heat exchanger (upper line) represents the colder heat exchanger of the two, which was operated at less than 170° C. This first heat exchanger did not decrease in efficiency because at this temperature the solubility point of calcium sulfate was not reached. The second heat exchanger (lower line) was hotter, was operated at about 220° C., and quickly scaled such that a efficiency decrease below 100% of the design heat transfer ability was seen. At this point, the entire process had to be shut down due to insufficient heat transfer and increased pressure drop due to scale formation.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A treatment process comprising:
    reducing a temperature of a regenerated carbon material exiting a wet air oxidation unit in a first heat exchanger;
    delivering the reduced temperature regenerated carbon material from the first heat exchanger to a second heat exchanger, wherein the second heat exchanger heats a spent carbon material comprising spent carbon and a scale forming contaminant with heat from the regenerated carbon material to generate a heated spent carbon material; and
    delivering the heated spent material to the wet air oxidation unit for regeneration of the heated spent carbon material;
    wherein the temperature is reduced to a temperature less than a solubility temperature limit of the scale forming contaminant at a given concentration of the scale forming contaminant.

2. The process of claim 1, wherein the temperature is reduced to a temperature of about 100° C. to about 185° C.

3. The process of claim 1, wherein the regenerated carbon material further comprises an oxygen depleted gas mixture, wherein the oxygen depleted gas mixture is also utilized to heat the spent carbon material.

4. The process of claim 1, wherein the scale forming contaminant comprises a member selected from the group consisting of aluminum, calcium, carbonate, iron, magnesium, phosphorus, sulfate, and combinations thereof.

5. The process of claim 1, wherein the scale forming contaminant comprises calcium sulfate.

6. The process of claim 1, further comprising:
    additionally reducing a temperature of a material exiting the second heat exchanger with a third heat exchanger.

7. The process of claim 1, wherein the reducing is done via regulating a fluid flowing through the first heat exchanger via a fluid flow controller.

8. A treatment process comprising:
    reducing a temperature of a regenerated material exiting a wet air oxidation unit in a first heat exchanger;
    delivering the reduced temperature regenerated material from the first heat exchanger to a second heat exchanger, wherein the second heat exchanger heats a regenerable material comprising a scale forming contaminant therein with heat from the regenerated material to generate a heated regenerable material; and
    delivering the heated regenerable material to the wet air oxidation unit for regeneration of the heated regenerable material;
    wherein the temperature is reduced to a temperature less than a solubility temperature limit of the scale forming contaminant at a given concentration of the scale forming contaminant.

* * * * *